(12) United States Patent
Sekine et al.

(10) Patent No.: US 8,993,100 B2
(45) Date of Patent: *Mar. 31, 2015

(54) TRANSPARENT SHEET HAVING A PATTERN FOR INFRARED REFLECTION

(75) Inventors: Keiko Sekine, Chiba (JP); Yuichi Miyazaki, Tokyo (JP); Satoko Maenishi, Saitama (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 1662 days.

This patent is subject to a terminal disclaimer.

(21) Appl. No.: 12/005,427

(22) Filed: Dec. 27, 2007

(65) Prior Publication Data

US 2008/0233360 A1    Sep. 25, 2008

(30) Foreign Application Priority Data

Dec. 27, 2006  (JP) ................... 2006-352545

(51) Int. Cl.
   *B32B 33/00*  (2006.01)
   *B32B 38/00*  (2006.01)
   *B32B 37/24*  (2006.01)

(52) U.S. Cl.
   CPC ......... B32B 38/145 (2013.01); *B32B 2037/243* (2013.01); *B32B 2307/416* (2013.01); *B32B 2310/08* (2013.01); *B32B 2310/0831* (2013.01)
   USPC .................................................... 428/195.1

(58) Field of Classification Search
   CPC ........... G02B 5/2016; G06K 19/06037; G06F 3/0421; B32B 38/145; B32B 2037/243; B32B 2307/416; B32B 2310/08; B32B 2310/0831
   See application file for complete search history.

(56) References Cited

U.S. PATENT DOCUMENTS

| 4,410,570 | A |   | 10/1983 | Kreuzer et al. |
| 5,204,765 | A | * | 4/1993 | Mitsui et al. ................. 349/113 |
| 5,357,357 | A | * | 10/1994 | Imazeki et al. ............. 428/1.31 |
| 5,560,864 | A |   | 10/1996 | Goulding |
| 5,780,629 | A |   | 7/1998 | Etzbach et al. |
| 5,798,147 | A |   | 8/1998 | Beck et al. |
| 6,136,225 | A |   | 10/2000 | Meyer et al. |
| 2005/0045854 | A1 | * | 3/2005 | Radcliffe et al. .......... 252/299.7 |
| 2007/0154718 | A1 | * | 7/2007 | Silverman et al. ......... 428/411.1 |
| 2007/0290047 | A1 | * | 12/2007 | Tazaki et al. .................. 235/491 |

FOREIGN PATENT DOCUMENTS

| JP | 57-165480 A | 10/1982 |
| JP | 7-258638 A | 10/1995 |
| JP | 9-133810 A | 5/1997 |

(Continued)

*Primary Examiner* — Gerard Higgins
*Assistant Examiner* — Sathavaram I Reddy
(74) *Attorney, Agent, or Firm* — Smith Patent Office

(57) ABSTRACT

An infrared ray reflection pattern-printed transparent sheet is provided which can be applied to a data input system of a type of handwriting directly on a screen of a display device and provides a coordinate detect means and which is lightweight, low in a cost, readily increased in an area, possible in mass production and excellent in a read performance. It is an infrared ray reflection pattern-printed transparent sheet in which infrared ray reflective transparent patterns are printed on a surface of a transparent substrate and which is disposed oppositely to a front face of a display device. A cross section obtained by cutting the infrared ray reflective transparent patterns printed on the above transparent substrate in a face orthogonal to the above transparent substrate is formed so that it assumes a multilayer structure comprising a fixed repeating cycle when observed under a scanning electron microscope.

10 Claims, 3 Drawing Sheets

(56) References Cited

FOREIGN PATENT DOCUMENTS

| JP | 9-506088 A | 6/1997 |
|---|---|---|
| JP | 10-508882 A | 9/1998 |
| JP | 11-293252 A | 10/1999 |
| JP | 11-513019 A | 11/1999 |
| JP | 2001-005684 A | 1/2001 |
| JP | 2001-110045 A | 4/2001 |
| JP | 2001-243006 A | 9/2001 |
| JP | 2003-256137 A | 9/2003 |

* cited by examiner

6 μm

6 μm

TRANSPARENT SHEET HAVING A PATTERN FOR INFRARED REFLECTION

BACKGROUND OF THE INVENTION

1. Field of the Invention

The present invention relates to an infrared ray reflection pattern-printed transparent sheet.

2. Related Art

In recent years, increased is necessity to convert handwritten characters, pictures, marks and the like to electronic data which can be handled by information processing devices, and in particular, increased is demand to systems in which handwritten informations are input into a computer and the like in real time without passing through a read device such as a scanner and the like.

In order to meet the above situations, proposed are, for example, write type input devices equipped with an input means comprising a pen for handwriting and a face to be written thereon, an input line read means for reading an input line in handwriting input by means of the above input means, an input line converting means for converting the above input line informations into electronic data and an input line data sending means for sending the data converted by the above input line converting means to an information processing device, wherein the input line read means described above is carried out by reading marks which provide position informations formed on the face to be written by means of a sensor mounted in a pen; the above face to be written is a specific paper on which specific dot patterns absorbing an infrared ray are printed as the marks for providing the position informations; and the pen described above is equipped with an infrared ray irradiating part for irradiating the above face to be written with an infrared ray and an infrared ray sensor for detecting infrared ray patterns reflected by the above dot patterns.

In the devices described above, handwritten contents (input lines) can be converted into electronic data, but a direct input target is a dedicated paper, and a separate display device is required in order to display the input line informations converted into the electronic data. Line informations can be visualized on paper by using a pen tip which is charged with graphite or an ink so that lines can be recorded on paper. However, it is not suited to such intuitive and interactive operation as inputting line informations to charts shown on a display by handwriting, and a broader work space in inputting is required. Further, when recording lines on paper, a sheet in which handwriting input has once been finished can not be used, and therefore paper for input which is a consumable good has to be always stored, so that such operation is not suited particularly to mobile uses.

Accordingly, desired are input devices which make it possible to input contents handwritten directly on a screen surface of a display device into an information processing device and which are small-sized and can be produced at a low cost. In order to materialize this, paper which transmits light in a visible region and on which dot patterns are printed can be used as paper which is a means to be written thereon in the write type input device described above, and it is suitably set oppositely to a front face of a display device.

A transparent sheet satisfying the above requirement includes a sheet disclosed in, for example, a patent document 1, which is a transparent sheet mounted on a front face or a front side of a display device and on which marks capable of providing position informations for showing the positions of input lines by an electronic pen for input and the like are printed by using an ink emitting light which can be read by the above input line read means by irradiating with light having a prescribed wavelength. However, the kind of an ink which embodies the above transparent sheet is not described in the patent document 1, and only an idea or a desire of a transparent sheet is described therein. Thus, the examples of a specific transparent sheet are not shown therein.

Further, a coordinate input device prepared by using a transparent member on which a specific ink reflecting light in an infrared region is printed is disclosed in a patent document 2. However, the kind of the ink which materializes the above transparent sheet is not described as well in the patent document 2, and only an idea or a desire thereof is described therein. Thus, the examples of a specific transparent sheet are not shown therein.

On the other hand, when the above transparent sheet is practically used, informations are read, as can be found from FIG. 5 of the patent document 1, by bringing the electronic pen for input into contact with the dot patterns, and therefore the read angle is preferably broadened as much as possible to make it possible to meet various use environments. However, in the existing situation in which transparent sheets standing actual uses have not yet been materialized as described above, transparent sheets which can meet various use environments and which have a broad read angle and are excellent in a read performance are desired to be developed in order to actualize a system in which handwritten informations are input into a computer and the like in real time without passing through a read device such as a scanner and the like.

Patent document 1: Japanese Patent Application Laid-Open No. 256137/2003

Patent document 2: Japanese Patent Application Laid-Open No. 243006/2001

SUMMARY OF THE INVENTION

The present invention has been made in order to solve the problems described above, and an object of the present invention is to provide an infrared ray reflection pattern-printed transparent sheet in which data can be input directly into a display device by handwriting and which is lightweight, low in a cost, readily increased in an area, possible in mass production and excellent in a read performance including a broad read angle.

Intensive researches repeated by the present inventors in order to achieve the object described above have resulted in finding that the object described above can be achieved by irradiating with an infrared ray, a transparent sheet in which patterns comprising a transparent ink containing a liquid crystal material having a cholesteric structure are printed on a transparent substrate and making use of a light reflected therefrom, and thus they have come to complete the present invention.

That is, the present invention provides an infrared ray reflection pattern-printed transparent sheet in which infrared ray reflective transparent patterns are printed on a surface of a transparent substrate and which is disposed oppositely to a front face of a display device capable of displaying images, wherein an ink constituting the above transparent patterns contains an infrared ray reflection material; the above transparent patterns are patterns in which reflected patterns of an infrared ray are read by an input terminal capable of irradiation and detection of an infrared ray and in which position informations of the input terminal on the transparent sheet can be provided; the above infrared ray reflection material is a liquid crystal material which has a wavelength selection reflectivity to a wavelength in an infrared region and which assumes a fixed cholesteric structure; a cross section obtained by cutting the infrared ray reflective transparent patterns printed on the above transparent substrate in a face orthogonal to the above transparent substrate is formed so that it assumes a multilayer structure comprising a fixed repeating cycle when observed under a scanning electron microscope; and a tilt angle formed by a helical axis of the above liquid crystal material constituting the multilayer structure and a normal line on the surface of the transparent substrate is distributed in a range of at least 0 to 45°.

The infrared ray reflection pattern-printed transparent sheet of the present invention is lightweight, low in a cost, readily increased in an area, possible in mass production and excellent in a read performance including a broad read angle, and therefore the above transparent sheet makes it possible to input data directly into a display device by handwriting and reduce a work space.

Figure 1:
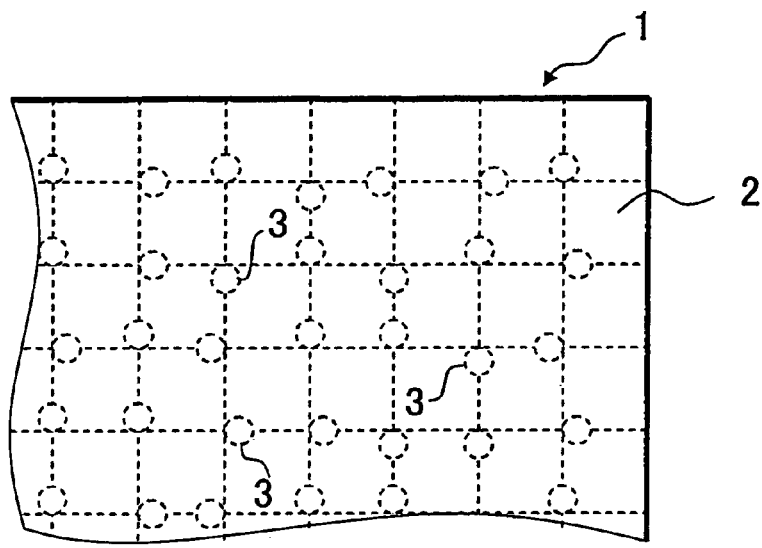
FIG. 1 is a schematic drawing of a whole system using the infrared ray reflection pattern-printed transparent sheet of the present invention.

| EXPLANATIONS OF THE CODES | |
|---|---|
| 1: | Infrared ray reflection pattern-printed transparent sheet (transparent sheet) |
| 2: | Transparent substrate |
| 3: | Transparent patterns |
| 4: | Primer layer |
| 5: | Display device |
| 6: | Input terminal (pen type) |
| 7: | Read data processing device |
| 8: | Cord |
| i: | Infrared ray |
| r: | Reflected light |

BEST MODE FOR CARRYING OUT THE INVENTION

The infrared ray reflection pattern-printed transparent sheet 1 of the present invention is a sheet in which a primer layer 4 is laminated, if necessary, on the surface of a transparent substrate 2 as shown in FIGS. 1 to 4 and in which infrared ray reflective transparent patterns 3 are printed on the above primer layer 4, and it is disposed oppositely to a front face of a display device 5 capable of displaying images. The term [disposed oppositely to a front face of a display device capable of displaying images] is a concept including, for example, a case in which the transparent sheet 1 is disposed in direct contact with the surface of the display device 5, a case in which the transparent sheet 1 is adhered thereon via a pressure-sensitive adhesive layer or an adhesive layer and a case in which the transparent sheet 1 is disposed in front of the display device 5 via a space in a non-contact state. An ink constituting the above transparent patterns 3 contains an infrared ray reflection material and makes it possible to read reflected patterns of an infrared ray by an input terminal 6 capable of irradiation and detection of an infrared ray to provide position informations (position coordinate) of the input terminal on the transparent sheet 1. The infrared ray reflection material described above is a liquid crystal material which has a wavelength selection reflectivity to a wavelength in an infrared region and which assumes a fixed cholesteric structure, and a cross section obtained by cutting the infrared ray reflective transparent patterns 3 printed on the transparent substrate 2 in a face orthogonal to the above transparent substrate is formed so that it assumes a multilayer structure comprising a fixed repeating cycle when observed on a scanning electron microscope (SEM). A tilt angle formed by a helical axis of the above liquid crystal material and a normal line on the surface of the transparent substrate is distributed in a range of at least 0 to 45°. In the above case, the definition [a normal line on the surface of the transparent substrate] is used considering a case in which the above transparent substrate has such a non-flat surface as curved along the curved surface of the display device 5, and when the above transparent substrate has a flat surface, the normal line agrees with a mere vertical line.

Transparent Ink:

The infrared ray reflective transparent patterns (hereinafter referred to as the transparent patterns) used in the present invention are formed by a transparent ink containing a liquid crystal material having a fixed cholesteric structure, and a cross section obtained by cutting the transparent patterns in a face orthogonal to the transparent substrate is formed so that it assumes a multilayer structure comprising a fixed repeating cycle when observed under a scanning electron microscope. A tilt angle formed by a helical axis of the above liquid crystal material constituting the multilayer structure and a normal line on the surface of the transparent substrate is distributed in a range of at least 0 to 45°.

In this connection, a molecule of a liquid crystal having a cholesteric (chiral nematic) structure has a helical structure (cholesteric structure) of a fixed cycle which is a multilayer structure in a direction (an incident angle θ of light shown below=0°) of a normal line to the surface of the transparent substrate, and it reveals characteristic optical properties originating in the above structure. The characteristic of the cholesteric structure is to have the wavelength selection reflectivity that it reflects a circularly polarized light of a wavelength corresponding to a direction of the helix and a helical pitch. In general, a selective reflection wavelength λ (peak wavelength λ nm) is given by the following equation:

$$\lambda = p \cdot n \cdot \cos\theta$$

p: helical pitch (nm) of cholesteric liquid crystal
n: average refractive index in a face orthogonal to a helical axis of liquid crystal
θ: incident angle of light (angle measured from a normal line on the surface)

In general, a band width Δλ (nm) of the above selective reflection wavelength λ (peak wavelength λ) is given by the following equation:

$$\lambda = p \cdot \Delta n \cdot \cos \theta$$

p: helical pitch (nm) of cholesteric liquid crystal
Δn: birefringent factor in a face orthogonal to a helical axis of liquid crystal
θ: incident angle of light (angle measured from a normal line on the surface)

A liquid crystal having a cholesteric structure has the above selective reflection performance and is easily handled and excellent in processability, and therefore it is expected to be widely applicable in an industrial scale. However, it can be found from the foregoing equation regarding the selective reflection wavelength λ that since when an incident angle grows large in a liquid crystal having a cholesteric structure, a wavelength of light reflected is reduced, so that a reflected wavelength deviates from a prescribed wavelength, that is, a read angle is limited. In the transparent sheet of the present invention, a tilt angle formed by a helical axis of the liquid crystal having a cholesteric structure and a normal line on the surface of the transparent substrate is distributed in a range of at least 0 to 45°, whereby such limitation of the read angle as described above is eliminated, and the broader read angle is obtained.

Figure 5:
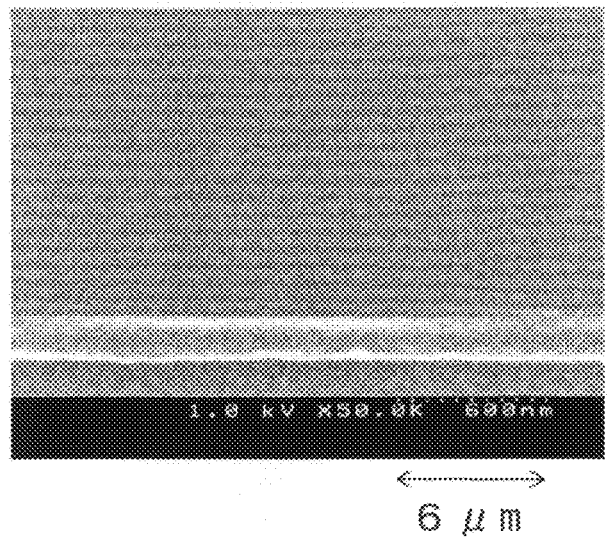
FIG. 5 is a scanning electron micrograph showing a repetitive layer structure of a cholesteric liquid crystal.

One pitch of a cholesteric structure is a length of an axis observed when a long and narrow liquid crystal molecule rotates by 360° in a helical form, and actual observation of the cross section reveals a repetitive layer structure in every rotation of 180° (refer to FIG. 5). Accordingly, an apparent interlayer pitch found in observing the cross section is ½ of a helical pitch of the liquid crystal, and if an apparent interlayer pitch found in observing the cross section is, for example, 250 nm, a pitch of the liquid crystal is 500 nm.

When a circularly polarized light comes in, reversed is a rotational direction in a circularly polarized light component of light reflected on the surface of a transparent substrate comprising a material such as a resin, glass and the like which is usually used as a substrate. On the other hand, a rotational direction in a circularly polarized light component of light reflected on the surface of a cholesteric liquid crystal is as it is and unchanged. Accordingly, making use of the above property makes it possible to improve an SN ratio of light reflected from an infrared ray reflective transparent pattern to a background light (light reflected from other parts than the pattern part) by combining with a circular polarization filter.

As described above, in a coating film of a usual cholesteric liquid crystal material, a helical axis of the above cholesteric structure substantially turns evenly to a normal line direction (refer to FIG. 5). In other words, a Bragg reflection face formed by the above cholesteric structure constitutes a parallel plain face group. In such case, a specific one reflection angle corresponds only to a specific one incident angle, and therefore a light quantity returning to an input terminal (input pen) in writing is increased or decreased according to a tilt of the input terminal, which ends up allowing the read angle (allowable tilt angle of the input terminal) to be narrowed.

On the other hand, in the transparent sheet of the present invention, a tilt angle formed by a helical axis of the liquid crystal constituting the transparent patterns and a normal line on the surface of the transparent substrate is distributed in a range of at least 0 to 45°. That is, it means that a Bragg reflection face (group) formed by the above cholesteric structure which is intrinsically a parallel plain face group assumes forms listed up below.

(A) The Bragg reflection face (group) is folded or undulated.
(B) A surface form of the transparent patterns is curved in a semispherical form or so that it is similar to the semispherical form, and the respective Bragg reflection faces (groups) are curved according to the above surface forms and incline continuously from a central part through a contour part.
(C) In at least a part of a region in the transparent patterns, the Bragg reflection face (group) forms irregularities in a range in which a wavelength selection reflectivity is not damaged in actual use.
(D) The Bragg reflection face has characteristics obtained by combining two or more kinds of (A) to (C) described above.

As described above, the transparent sheet of the present invention has the characteristic that it generates reflected rays having plural reflection angles for a specific one reflection angle, and therefore even if the input terminal (input pen) in writing inclines within some range, incidence of any rays into the input terminal makes it possible to detect the transparent patterns. The above characteristic reduces a variation in an increase and a decrease of a light quantity returning to the input terminal in the transparent sheet of the present invention and makes it possible to maintain the light quantity in a fixed quantity or more within some range, and the read angle (an allowable tilt angle of the input terminal) is broadened. A specific means for obtaining the broad read angle shall be described later in the specifics of the constitutions for the transparent sheet of the present invention.

The liquid crystal material having a cholesteric structure contained in the transparent ink which can be applied to the transparent sheet of the present invention shall be explained below. In the present invention, a wavelength of an infrared ray shall not specifically be restricted, and usually a ray in a near infrared region of particularly 800 to 2500 nm is preferably used. In the following, explanations shall be given with a focus put on an infrared ray in the above wavelength region.

In general, [liquid crystal] refers to a liquid crystal staying in a state showing a fluidity in a narrow sense, but in the specification of the present invention, a liquid crystal material having a fluidity which is solidified by means such as cross-linking, cooling and the like in the state that desired performances such as optical characteristics, a refractive index, an anisotropy and the like each owned by liquid crystals are maintained and which is turned into a non-fluid state shall be called as well [liquid crystal].

The infrared ray reflection material constituting the transparent patterns used in the present invention is a liquid crystal material showing a cholesteric liquid crystal phase having a cholesteric regularity. In the case of the transparent sheet of the present invention which is suited to such uses that data are input directly into a display device by handwriting, the liquid crystal material has to be solidified after forming the transparent patterns so that a fluidity is not developed. In order to meet the above requirement, polymerizable chiral nematic liquid crystal materials (polymerizable monomer or polymerizable oligomer) or high molecular cholesteric liquid crystal materials prepared by mixing polymerizable nematic liquid crystals with a polymerizable chiral agent can preferably be used.

In the present invention, among the polymerizable liquid crystal materials described above, cross-linkable polymerizable monomers or polymerizable oligomers are preferably used, and they have more preferably an acrylate structure as a polymerizable functional group.

In the case of the liquid crystal materials assuming (developing) the cholesteric structure described above, a high transmittance is not necessarily required in a wavelength of a visible ray region as long as they have a high reflectance (usually about 5 to 50%) in at least a part of a wavelength of an infrared region. This is because assuming that if the polymerizable liquid crystal materials assuming the cholesteric structure described above are completely opaque, a desired transparency can be obtained if an area of a non-forming part (margin part) in the above liquid crystal materials is taken to a suitably large extent to make use of a light transmitting through the above part. However, it is a matter of course that a visible light transmittance of the above liquid crystal materials is preferably higher. Usually, if a high reflection wavelength area of the above polymerizable liquid crystal materials assuming a cholesteric structure is set to an infrared region, a visible light transmittance of about 70% or more is obtained in a thickness of about several μm in a visible ray region. On the other hand, a high reflectance of about 5 to 50% is usually obtained in an infrared region. Also, a temperature range in which the polymerizable liquid crystal materials described above assume a cholesteric structure shall not specifically be restricted, and it can preferably be fixed in the state of a cholesteric phase by cross-linking. The materials in which a temperature allowing the materials to assume a cholesteric phase falls in a range of 30 to 140° C. are preferred since a drying step in printing the patterns and a phase transition of the liquid crystal can be carried out at the same time.

Such materials as described above can be optically fixed while allowing liquid crystal molecules to stay in a state of a cholesteric liquid crystal, and the patterns which are easily handled as a transparent sheet and which are stable at ambient temperature can be formed.

Further, capable of being used as well are liquid crystal polymers (high molecular cholesteric liquid crystals) which have a high glass transition temperature and which can be solidified in a glass state at ambient temperature by cooing after heating. The above materials can be optically fixed as well while allowing liquid crystal molecules to stay in a state of a liquid crystal having a cholesteric regularity, and patterns which are easily handled as an optical sheet and which are stable at ambient temperature can be formed.

Mixtures of liquid crystalline monomers and chiral compounds disclosed in Japanese Patent Application Laid-Open No. 258638/1995, Japanese Patent Application Laid-Open (through PCT) No. 513019/1999, Japanese Patent Application Laid-Open (through PCT) No. 506088/1997 and Japanese Patent Application Laid-Open (through PCT) No. 508882/1998 can be used as the cross-linkable polymerizable monomers described above. For example, a chiral nematic liquid crystal (cholesteric liquid crystal) is obtained by adding a chiral compound to a liquid crystalline monomer showing a nematic liquid crystal phase. Processes for producing films of cholesteric liquid crystals are described as well in Japanese Patent Application Laid-Open No. 5684/2001 and Japanese Patent Application Laid-Open No. 110045/2001.

The nematic liquid crystal molecules (liquid crystalline monomers) which can be used in the present invention include, for example, compounds represented by Formulas (1) to (11) shown below. The compounds shown below as examples have an acrylate structure and can be polymerized by irradiating with a UV ray and the like.

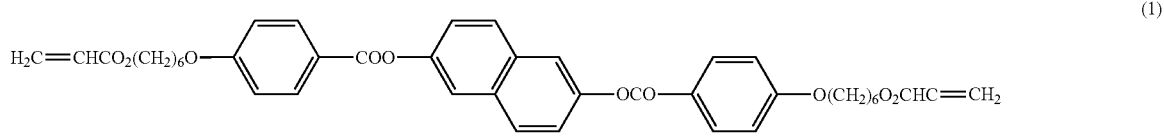

(1)

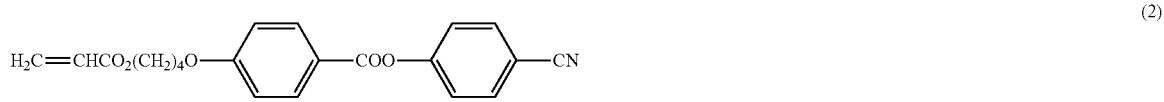

(2)

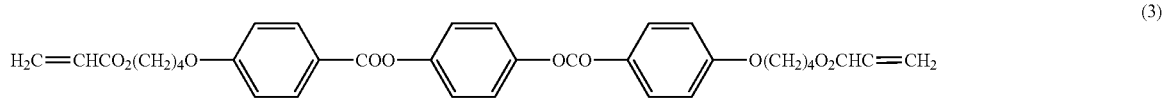

(3)

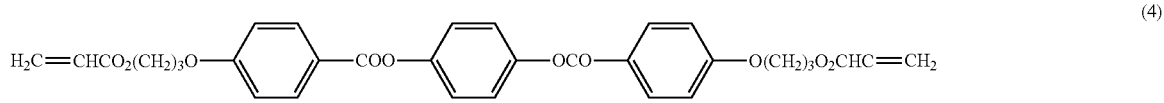

(4)

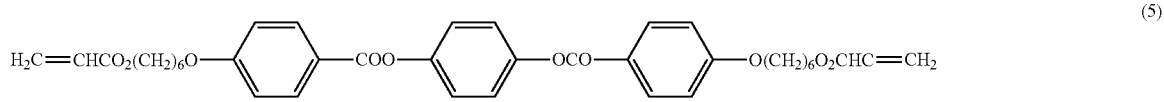

(5)

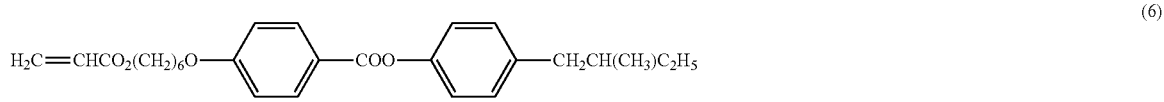

(6)

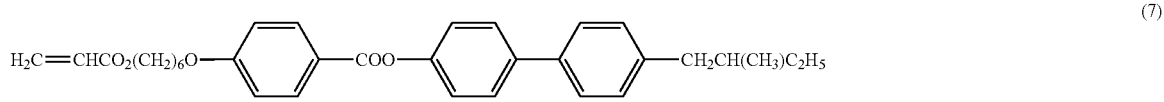

(7)

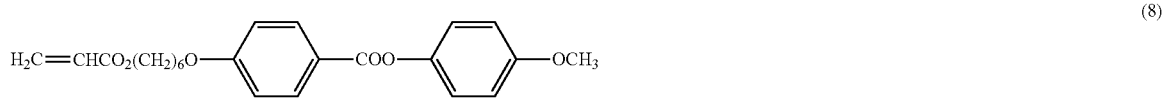

(8)

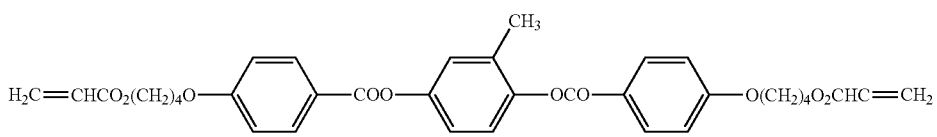

(9)

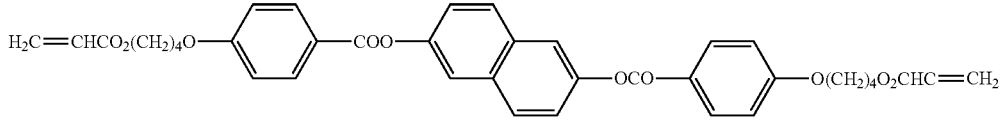

(10)

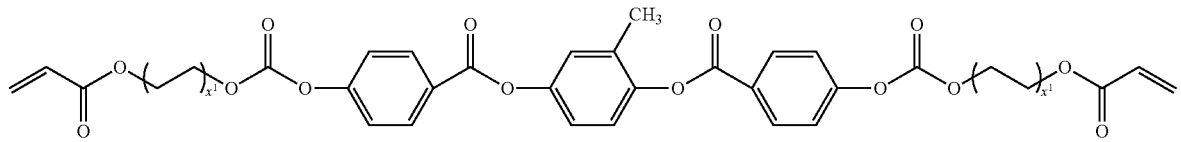

(11)

In Compound (11), $X^1$ is 2 to 5 (integer).

Also, cyclic organopolysiloxane compounds having a cholesteric phase disclosed in Japanese Patent Application Laid-Open No. 165480/1982 can be used as the cross-linkable polymerizable oligomers described above.

Further, high polymers which assume a liquid crystal and in which a mesogen group is introduced into a position of a principal chain or a side chain or both positions of a principal chain and a side chain, high molecular cholesteric liquid crystals in which a cholesteryl group is introduced into a side chain, liquid crystalline high polymers disclosed in Japanese Patent Application Laid-Open No. 133810/1997 and liquid crystalline high polymers disclosed in Japanese Patent Application Laid-Open No. 293252/1999 can be used as the liquid crystal polymers described above.

The chiral agent contained in the transparent ink used in the present invention is a material which has an asymmetric carbon atom and which forms a chiral nematic phase by mixing with a nematic liquid crystal, and it shall not specifically be restricted as long as it has a polymerizability. A material having an acrylate structure represented by Formula (12) is preferred since it is polymerizable by irradiation with a UV ray.

Bragg reflection conditions) is determined by a pitch length of a cholesteric structure contained in the patterns, and when the nematic liquid crystal and the chiral agent are used as the liquid crystal material, the pitch length can be controlled by controlling an addition amount of the chiral agent. An addition amount of the chiral agent for obtaining the selective reflection peak wavelength in the targeted infrared region is varied depending on the kinds of the liquid crystal used and the chiral agent, and when using, for example, the liquid crystal represented by Formula (11) and the chiral agent represented by Formula (12), a cholesteric phase having a reflection peak in an infrared region is formed by adding about 3 parts by weight of the chiral agent to 100 parts by weight of the liquid crystal. When a high molecular cholesteric liquid crystal is used for the liquid crystal material, a polymer material having the targeted pitch length is suitably selected.

The polymer of the nematic liquid crystal molecules and the chiral agent in the present invention can be obtained, for example, by adding a publicly known photopolymerization initiator and the like to a polymerizable nematic liquid crystal and a polymerizable chiral agent and irradiating the mixture with a UV ray to radically polymerize it.

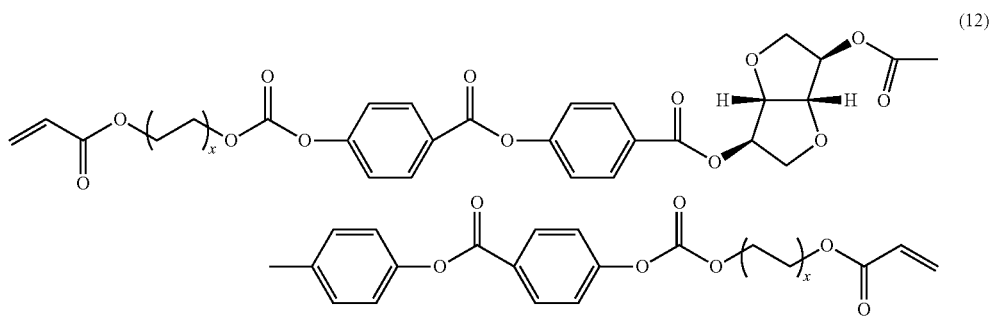

(12)

X is 2 to 5 (integer)

The property of reflecting an infrared ray by the transparent patterns in the present invention makes use of, as described above, a wavelength selection reflectivity (the same principle as Bragg reflection in X-ray diffraction) of a liquid crystal material having a cholesteric structure. The selective reflection peak wavelength thereof (wavelength satisfying the Also, when printing the transparent patterns in the present invention, a coating liquid prepared by dissolving the polymerizable monomer or the polymerizable oligomer and the chiral agent in a solvent is preferably used.

The above solvent shall not specifically be restricted as long as it has a satisfactory solubility to the materials, and publicly known compounds are suitably used. It includes, for example, conventional solvents such as anone (cyclohexanone), cyclopentanone, toluene, acetone, MEK (methyl ethyl ketone), MIBK (methyl isobutyl ketone), DMF (N,N-dimethylformamide), DMA (N,N-dimethylacetamide), methyl acetate, ethyl acetate, n-butyl acetate, 3-methoxybutyl acetate and the like and mixed solvents thereof.

Further, the transparent ink according to the present invention can be blended with a leveling agent, fine particles and the like in order to obtain a broad read angle and a coating property. Any compounds can be used as the leveling agent and the fine particles without providing specific restrictions as long as they do not disturb orientation of the liquid crystal more than necessity (more than providing a helical axis of the liquid crystal material with a desired angle (distribution)), and they can be used without limiting to the compounds used for the primer layer described above.

In the transparent sheet of the present invention, a printing method for the transparent patterns shall not specifically be restricted, and publicly known methods can be used and include, for example, a flexographic printing method, a gravure printing method, a stencil printing method, an ink jet printing method and the like.

In the infrared ray reflection pattern-printed transparent sheet of the present invention, the above patterns are set so that the position informations of the input terminal on the sheet face can be derived from the partial patterns read by the input terminal equipped with a sensor.

Several examples of the above patterns are shown as well in the patent documents 1 and 2 and include, for example, patterns obtained by setting plural forms of dots and patternizing combinations of the dots of these plural forms arranged in a prescribed range in a plain face, patterns obtained by changing thicknesses of ruled lines arranged vertically and horizontally and patternizing combinations of sizes of the overlapped parts of the ruled lines described above in a prescribed range and patterns obtained by combining the values of x, y coordinates directly with the vertical and horizontal sizes of dots. Particularly simple and suited patterns include dot patterns obtained by setting standard points arranged vertically and horizontally at equal intervals, disposing dots displaced right and left, up and down based on the above standard points and making use of a relative positional relation from the above standard points. The above method is advantageous for raising a resolution of the input device since a size of the dots can be reduced and fixed, and it is suited from the viewpoint of obtaining the broader read angle. Further, from the viewpoint of obtaining the broader read angle, the transparent patterns can be subjected to mechanical irregularity treatment by means of an embossed plate and the like after they are formed by the transparent ink, and the irregularity treatment can be carried out by conventional means.

In the infrared ray reflection pattern-printed transparent sheet of the present invention, a larger infrared ray reflectance in a selective reflection peak wavelength is preferred in order to detect reflected patterns by means of an infrared sensor installed in the input device. The infrared ray reflectance in a selective reflection peak wavelength is usually 5 to 50%, preferably 20% or more. Reflection by a cholesteric structure has a property to reflect only a circularly polarized light having the same direction as that of a cholesteric spiral, and therefore the reflectance reaches only about 50% at a maximum.

In the case of reflection by a cholesteric structure, usually the larger the print thickness is, the larger the reflection intensity is. If the thickness is too large, however, an unnecessary disturbance in an orientation of the liquid crystal, a reduction in the transparency and an increase in the dry load are brought about, and therefore a print thickness of the infrared ray reflection patterns is usually 1 to 20 μm, preferably 3 to 15 μm. It is assumed that when a helical pitch number of a cholesteric liquid crystal structure is 10 to 20 pitches, the reflectance reaches a saturated state. In the actual production, however, if a liquid crystal composition and solidification conditions are determined, a film thickness at which a reflection intensity is saturated can be experimentally determined, and the reflectance is suitably optimized. If the film thickness (or the pitch number) falls in the range described above, the printed patterns can be prevented from being abraded and damaged, and the production cost can be inhibited from rising more than necessary.

When the printed patterns are dot patterns, the dot forms shall not specifically be restricted as long as the dots can readily be distinguished from the adjacent dots, and the forms in which plane-viewing forms are circular, elliptic and polygonal forms are usually used. The steric forms of the dots shall not specifically be restricted as well, and they are usually discoid but may be semispherical and concave.

Transparent Substrate:

The transparent substrate used for the infrared ray reflection pattern-printed transparent sheet of the present invention shall not specifically be restricted as long as it is a material transmitting a visible light, and it is preferably made of a material having less optical defects. So-called films, sheets or materials having a tabular form are suitably used. Further, it may be flat, and in addition thereto, it may have a curved surface form so that it fits a curved surface of a display. To be specific, glass, TAC (triacetyl cellulose), PET (polyethylene terephthalate), polycarbonate, polyvinyl chloride, acryl, polyolefin and the like are suitably used as the materials for the transparent substrate. The thickness thereof is selected from a range of 20 to 5000 μm, preferably 100 to 5000 μm from the viewpoint of the curling property according to the material, the required performances and the use form.

When a material which is liable to be dissolved or swollen in a solvent, such as a high molecular film including a TAC film and the like is used as the transparent substrate described above, a barrier layer may be provided on the substrate so that the substrate is not damaged by a solvent contained in the coating liquid used in printing the transparent patterns. For example, water-soluble materials such as PVA (polyvinyl alcohol), HEC (hydroxyethyl cellulose) and the like are suitably used for the barrier layer.

An irregular layer can preferably be provided on the surface (a laminated side of the primer layer) of the transparent substrate for the purpose of obtaining the broad read angle. A method for forming the above irregular layer shall not specifically be restricted as long as irregularities can be formed on the surface of the transparent substrate, and a dry process and a wet process each described later can preferably be used. The dry process includes a process in which fine irregularities are formed on the surface by means of a hot press using an embossed plate and a process in which fine irregularities are formed on the surface by a sand blast method. The wet process includes, for example, a process in which a curable composition prepared by dispersing silica particles having an average particle diameter of usually 30 μm or less, preferably 2 to 15 μm in an amount of 0.1 to 10 mass parts per 100 mass parts of the resin in a curing type resin such as an acryl resin, a diene base resin, a polyester base resin, a silicone base resin and the like is coated by gravure coating, reverse roll coating, die coating or the like so that the thickness after drying is 5 to 30 μm and in which it is dried and, if necessary, cured by heating or irradiating with an ionizing radiation such as a UV ray, an electron beam and the like.

Further, capable of being used as the wet process are a process in which a coating liquid containing an ionizing radiation-curing type resin and, if necessary, a photopolymerization initiator is coated on a plate having irregularities and cured by irradiating with an ionizing radiation in the state that the coating film is brought into contact with a PET base substrate film and in which the above plate is then separated to transfer the irregularities onto the surface of the PET base substrate film and a process in which the coating liquid described above is coated on an embossing film having irregularities and cured by irradiating with an ionizing radiation in the state that the coating film is brought into contact with a PET base substrate film and in which the above embossing film is then separated to transfer the irregularities onto the surface of the PET base substrate film.

The ionizing radiation-curing type resin described above includes reins having functional groups of a (meth)acrylate base which are cured by an ionizing radiation such as a UV ray, an electron beam and the like, for example, oligomers or prepolymers and monomers of (meth)acrylates of multifunctional compounds, such as polyester resins, polyether resins, acryl resins, epoxy resins, urethane resins, alkyd resins, spiroacetal resins, polybutadiene resins, polythiolpolyene resins, polyhydric alcohols and the like each having a relatively low molecular weight. The specific examples thereof include monofunctional monomers such as ethyl(meth)acrylate, ethylhexyl(meth)acrylate, styrene, methylstyrene, N-vinylpyrrolidone and the like and multifunctional monomers, for example, polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate and the like. In this regard, (meth)acrylate is expression which means acrylate or methacrylate.

In addition to the above, resins having a cationically polymerizable functional group, for example, epoxy resins and the like can be used as well.

When a UV ray-curing type resin is used as the ionizing radiation-curing type resin described above, a photopolymerization initiator is preferably used in combination. The specific examples of the photopolymerization initiator include acetophenones, benzophenones, Michler benzoyl benzoate, α-amyloxime ester, tetramethylthiuram monosulfide, thioxanthones and the like when used for radically polymerizable resins such as (meth)acrylates and aromatic iodonium salts, aromatic sulfonium salts, aromatic diazonium salts, metallocene and the like when used for cationically polymerizable resins such as epoxy resins. Further, a photosensitizer is preferably used in a mixture, and the specific examples thereof include n-butylamine, triethylamine, tri-n-butylphosphine and the like.

Primer Layer:

In the infrared ray reflection pattern-printed transparent sheet of the present invention, it is preferred from the viewpoint of obtaining a broad read angle that a primer layer 4 is provided on the surface of the transparent substrate 2 and that the above primer layer is provided on a surface thereof with a fine irregular form or a liquid repellent substance is added thereto. A material constituting the above primer layer 4 is preferably transparent resins comprising organic resins, inorganic resins and the like particularly in terms of capable of forming a layer by coating. The resins used for the primer layer shall not specifically be restricted as long as they are resins which have a sufficiently small difference in a refractive index from those of the dot patterns and which are sufficiently low in a reflectance and an absorbance of an infrared ray used for reading as compared with the dot patterns and are transparent to a visible light and an infrared ray used for reading, and they include, for example, thermoplastic resins, thermosetting resins, ionizing radiation-curing resins and the like. Among them, resins of a type in which curing is carried out by cross-linking are preferred from the viewpoint of obtaining a durability, a solvent resistance and a broad read angle, and the ionizing radiation-curing resins which can be cross-linked for short time by an ionizing radiation are more preferred. The above ionizing radiation-curing resins are advantageous in terms of being liable to fill irregularities by the transparent patterns since they can be coated in a state of non-solvent or close to non-solvent. The resins used in the irregular layer described above are preferably used as the above ionizing radiation-curing resins.

The thermoplastic resin described above includes, for example, acryl resins, polyester resins, thermoplastic urethane resins, vinyl acetate resins, cellulose base resins and the like, and when the material of the transparent substrate is a cellulose base resin such as TAC (triacetyl cellulose) and the like, the thermoplastic resin is preferably the cellulose base resin such as nitrocellulose, acetyl cellulose, cellulose acetate propionate, ethyl hydroxyethylcellulose and the like.

The thermoplastic resin described above includes, for example, phenol resins, urea resins, diallyl phthalate resins, melanin resins, guanamine resins, unsaturated polyester resins, urethane resins, epoxy resins, aminoalkyd resins, melamine-urea resins, silicone resins, polysiloxane resins, curable acryl resins and the like. When the thermosetting resin is used, a cross-linking agent, a curing agent such as a polymerization initiator and the like, a polymerization accelerating agent, a solvent, a viscosity controlling agent and the like can be further added if necessary and used.

From the viewpoint of obtaining the broad read angle, a leveling agent (liquid repellent substance) is preferably added to the primer layer to curve the surface of the transparent patterns into a convex curved surface (for example, a curved surface such as a semisphere), or fine particles are preferably added to the primer layer to form irregularities and folding on a Bragg reflection surface having a cholesteric structure of liquid crystal formed thereon.

Conventionally used compounds can be used as the leveling agent without specific restrictions, and it includes, for example, various surfactants of a fluorine base, a silicone base and an acrylic acid copolymer base and can suitably be added according to the desired read angle.

Conventionally used substances can be used in a suitable amount as the fine particles without specific restrictions, and they include, for example, spherical particles of α-alumina, silica, kaolinite, iron oxide, diamond, silicon carbide and the like in the case of inorganic particles. The form of the particles includes a sphere, an ellipsoid, a scale and the like, and it shall not specifically be restricted but is preferably a sphere. They include synthetic resin beads of a cross-linked acryl resin, a polycarbonate resin and the like in the case of organic particles. Among them, α-alumina and silica are preferred from the standpoints that they have a high hardness and are very effective for enhancing the abrasion resistance and that spherical particles are liable to be obtained, and the spherical particles thereof are particularly preferred. The fine particles have a particle diameter of 50 μm to 5 mm.

Publicly known various additives and various pigments in coating liquid and inks may suitably be added, if necessary, to the primer layer as long as an infrared reflection function and a moiré preventing effect of the transparent patterns in the present invention are not damaged. The additives include, for example, light stabilizers such as UV absorbers, dispersion stabilizers and the like, and the pigments include, for example, pigments which are publicly known in filters for displays, such as pigments for preventing outside light reflection.

The primer layer is a layer formed by using a composition containing, in addition to the resin described above, usually a solvent and, if necessary, various additives, a pigment and the like as a coating liquid or an ink. The solvent shall not specifically be restricted as long as it has a satisfactory solubility to the materials, and publicly known solvents are suitably used. They include, for example, conventional solvents such as anone (cyclohexanone), cyclopentanone, toluene, acetone, MEK (methyl ethyl ketone), MIBK (methyl isobutyl ketone), DMF (N,N-dimethylformamide), DMA (dimethylacetamide), methyl acetate, ethyl acetate, n-butyl acetate, 3-methoxybutyl acetate and the like and mixed solvents thereof.

The primer layer can be formed by coating the ink obtained in the manner described above by a publicly known layer forming method such as a coating method, a printing method and the like. To be specific, it is suitably formed on a printed face of the transparent substrate on which the transparent patterns have already been printed by a coating method such as roll coating, comma coating, die coating and the like or a printing method such as screen printing, gravure printing and the like. It is easy to partially form the primer layer in an optional shape by the printing method, and it can partially be formed by intermittent coating as well in the coating method.

A thickness of the primer layer is usually 0.1 to 10 μm, and it is preferably 0.1 to 5 μm from the viewpoint of preparing the thinner film and obtaining the broader read angle.

Other Layers:

In the infrared ray reflection pattern-printed transparent sheet of the present invention, an overcoat layer (surface protect layer comprising a hard coating film) may be provided on the transparent substrate in order to provide the transparent sheet with a strength which can stand repetitive contact given by an input terminal of a pen type when inputting by handwriting by means of the input terminal. A material of the overcoat layer shall not specifically be restricted, and materials used in the fields of conventional transparent sheets and lenses can be used. The representative materials are, for example, acryl resins, silicone base resins and the like which are cross-linked and cured by a UV ray, an electron beam, heat and the like. Also, a material having a refractive index which is close to that of the liquid crystal material used for the transparent ink can preferably be used in order to reduce moiré.

Further, a reflection preventing film and the like may be provided on the surface of the sheet or in the inside thereof in order to secure a visibility of a display device present on the back of the infrared ray reflection pattern-printed transparent sheet of the present invention. A material of the reflection preventing film shall not specifically be restricted, and materials used in the fields of conventional transparent sheets for displays and lenses can be used. The representative materials are, for example, dielectric multilayer films prepared by laminating a thin film of a substance having a low refractive index such as magnesium fluoride, a fluorine base resin and the like and a thin film of a substance having a high refractive index such as zirconium oxide, titanium oxide and the like so that the above thin film having a low refractive index is provided on the outermost layer.

Display Device:

A display device in which the infrared ray reflection pattern-printed transparent sheet of the present invention is installed may be connected to an information processing device for processing handwritten input data or may be independent, and the former is preferred since it can show lines input by handwriting on a screen and enables to intuitively input.

In this regard, the examples which can be shown as an information processing device handling handwritten informations include portable phones, various mobile terminals such as PDA and the like, personal computers, TV phones, TV endowed with an intercommunication function, internet terminals and the like.

An input terminal 6 which can be used in the present invention shall not specifically be restricted as long as it can emits, as shown in FIG. 1, an infrared ray i and detect a reflected ray r of the patterns described above, and publicly known sensors are suitably used. An example in which the input terminal 6 of a pen type is equipped as well with a read data processing device 7 includes an input terminal disclosed in Japanese Patent Application Laid-Open No. 256137/2003, in which built-in are a pen tip provided with no ink and no graphite, a CMOS camera equipped with an infrared irradiation part, a processor, a memory, a communication interface such as a wireless transceiver and the like making use of a Bluetooth technique, a battery and the like.

Figure 2:
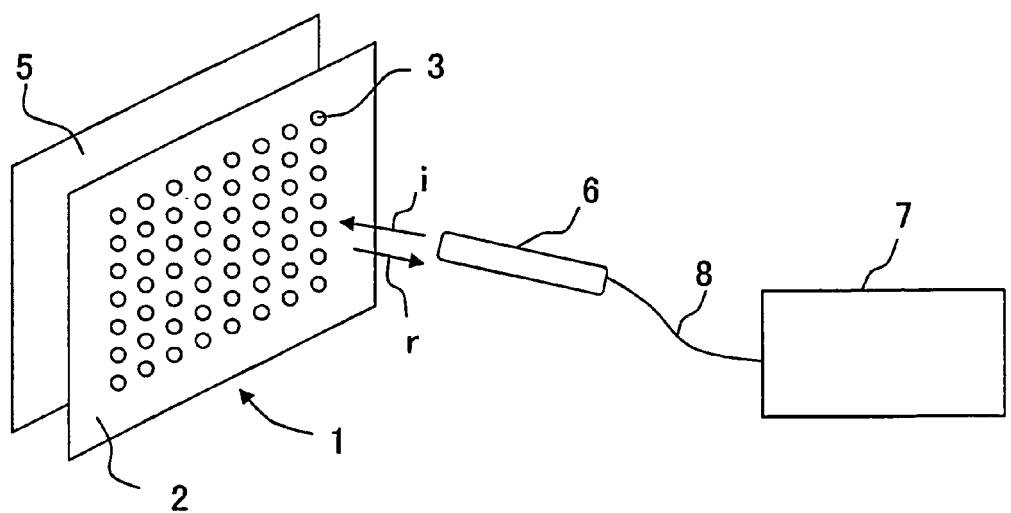
FIG. 2 is an enlarged substantial part of a plain drawing showing an example in which dot patterns are irregularly arranged in the infrared ray reflection pattern-printed transparent sheet of the present invention.
Figure 3:
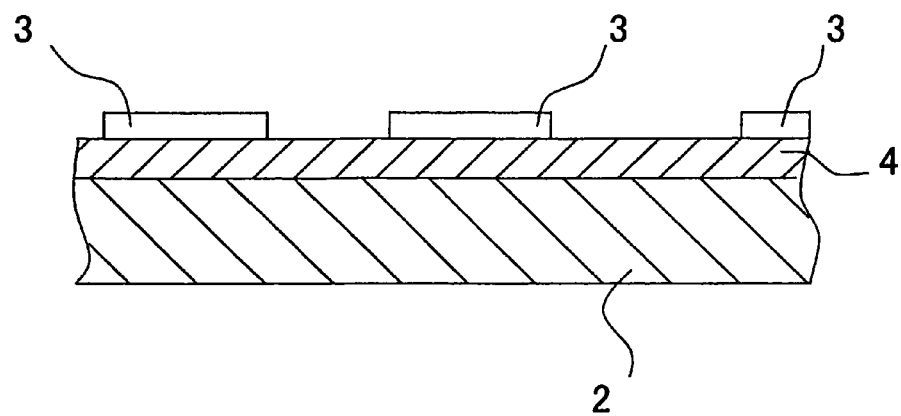
FIG. 3 is a cross section obtained by cutting the transparent sheet in a face orthogonal to the transparent substrate which shows one preferred embodiment of the infrared ray reflection pattern-printed transparent sheet of the present invention.
Figure 4:
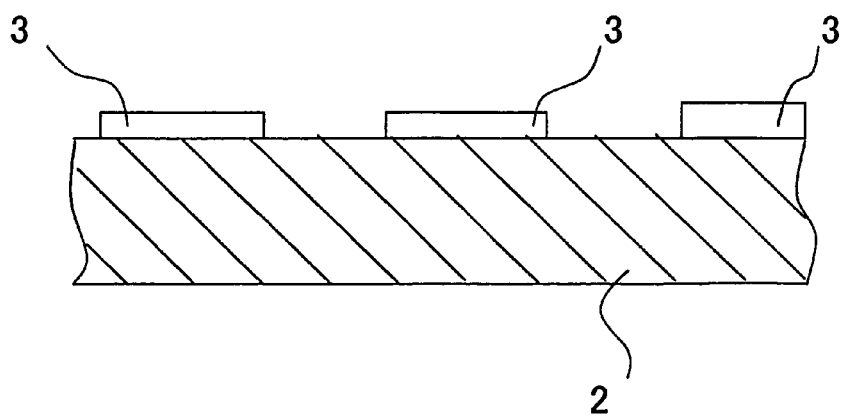
FIG. 4 is a cross section obtained by cutting the transparent sheet in a face orthogonal to the transparent substrate which shows one preferred embodiment of the infrared ray reflection pattern-printed transparent sheet of the present invention.

To explain the action of the pen type input terminal 6, the pen tip is brought into contact with a front surface of the transparent sheet 1 on which the transparent patterns 3 (dot patterns) shown in FIG. 2 are printed and draws lines so that the pen tip traces the front surface, and the pen type input terminal 6 detects a pen pressure applied onto the pen tip to operate the CMOS camera; a prescribed range in the vicinity of the pen tip is irradiated with an infrared ray of a prescribed wavelength emitted from the infrared irradiation part, and the patterns are imaged (the patterns are imaged several 10 to about 100 times per second). When the pen type input terminal 6 is equipped with a read data processing device 7, input lines formed by movement of the pen tip in handwriting are digitized and turned into data by analyzing the imaged patterns by means of the processor to prepare an input line data, and the input line data is sent to the information processing device.

The members such as the processor, the memory, the communication interface such as a wireless transceiver and the like making use of a Bluetooth technique, the battery and the like may be present, as shown in FIG. 1, as the read data processing device 7 outside the pen type input terminal 6. In this case, the pen type input terminal 6 may be connected to the read data processing device 7 via a cord 8 or may send read data by wireless using an electric wave, an infrared ray and the like.

In addition thereto, the input terminal 6 may be a reader described in Japanese Patent Application Laid-Open No. 243006/2001.

The read data processing device 7 which can be applied in the present invention shall not specifically be restricted as long as it has a function to calculate a position information from a continuous imaged data read by the input terminal 6 and combine it with a time information to provide it as an input line data which can be handled by the information processing device, and it is suitably equipped with the members such as the processor, the memory, the communication interface, the battery and the like.

The read data processing device 7 may be built in the input terminal 6 as described in Japanese Patent Application Laid-Open No. 256137/2003 or may be built in the information processing device equipped with a display device. The read data processing device 7 may send a position information to the information processing device equipped with a display device by wireless or may send it by wire connected thereto via a cord and the like.

The read data processing device 7 connected to the display device 5 can display lines input by handwriting by means of the input terminal 6 on the display device in real time (or in suitably delayed time if necessary) as if written on a paper by a pen by renewing sequentially images shown on the display device 5 based on line informations sent from the read data processing device 7.

As described above, the infrared ray reflection pattern-printed transparent sheet of the present invention can be installed as it is in an existing display device, and it can be prepared more readily than position input devices of an electrostatic type, a pressure-sensitive type and the like which are types built in a display device and readily makes it possible to reduce a weight, decrease a cost and increase a size. Further, even when the patterns which can provide the printed position informations are thinned or scratched, so that a function of providing the position informations is reduced, only the transparent sheet can be exchanged, and therefore it is liable to be handled for users.

The infrared ray reflection pattern-printed transparent sheet of the present invention can also be used as a liquid crystal protect sheet by mounting on a liquid crystal display.

The infrared ray reflection pattern-printed transparent sheet of the present invention can detachably be installed oppositely to the front face of the display device. The foregoing manner of installation thereof makes it possible to install the transparent sheet not only on one display device but also on another display device. Further, the transparent sheet itself is preferably equipped with a means for installation thereof onto the display device in order to make it possible to install the transparent sheet without processing the display device for installing the transparent sheet. The above installation means may be provided integrally with the transparent sheet or may be provided separately therefrom.

The above installation means includes buckle-shaped means which are hooked at the corner parts of the display device and means which pinch the end parts of the display device, and when installed on the front face of the display device, the specific embodiment thereof which is simple and suitable includes an adhering instrument which is provided at a contact face side brought into contact with the display device and which has an adhesive property or a sticky property for adhering the instrument onto the display device. Further, the adhering instrument includes instruments which are mounted integrally to the transparent sheet and which have an adhesive property or a sticky property and instruments containing an adhesive and a pressure-sensitive adhesive which are coated directly on a contact face.

The infrared ray reflection pattern-printed transparent sheet of the present invention is preferably separable in order to enhance convenience in the production thereof. To be specific, it includes the sheets which can be separated by cutting tools such as scissors or dedicated cutting tools and the sheets which can be separated with hands by providing perforated lines or half cuts (means which are used in many cases in the field of packaging materials and in which a cut line having such a depth that does not reach a whole depth is provided in a thickness direction). Such sheets can be cut by users according to a size of display devices owned by the respective users, and therefore the makers suitably produce the sheets set to several kinds of prescribed sizes. Further, cut lines corresponding to the standard sizes of dedicated display devices may be provided.

If the ways of use described above are possible, one sheet on which patterns providing position informations are printed can be divided so that the respective sheets show different coordinate ranges. When the above sheets are used, the sheet showing a continuous coordinate is applied to an adjacent display device, whereby input data can be provided with continuity. Further, plural transparent sheets having different coordinate ranges are used for one input device while switching the sheets over, whereby different meanings can be given to the respective transparent sheets.

EXAMPLES

Next, the present invention shall be explained in further details with reference to examples, but the present invention shall not be restricted to the examples shown below.

Example 1

A monomer (having a molecular structure shown by the compound (9) described above) 100 mass parts which has polymerizable acrylate groups at both ends, a mesogen group at a central part and a spacer between the acrylate groups described above and in which a nematic-isotropic transfer temperature is in the vicinity of 110° C. and a chiral agent (having a molecular structure shown by the compound (12) described above) 3.3 mass parts which has polymerizable acrylate groups at both ends were dissolved in MIBK (methyl isobutyl ketone) to prepare a methyl isobutyl ketone solution. A photopolymerization initiator (Lucirin (registered trade name) TPO, manufactured by BASF Japan Ltd.) 4 mass parts was added to the above methyl isobutyl ketone solution.

On the other hand, a solution prepared by dissolving 100 mass parts of pentaerythritol triacrylate, 0.03 mass part of a leveling agent (trade name: BYK361, manufactured by Bic Chemie AG.) and 4 mass parts of a polymerization initiator (trade name: Lucirin TPO, manufactured by BASF AG.) in a solvent of MEK (methyl ethyl ketone) was coated on a transparent substrate comprising transparent PET (polyethylene terephthalate) having a thickness of 125 μm and dried at 80° C. for 2 minutes to form a film (film thickness: 1 μm), whereby a primer layer was formed.

Figure 6:
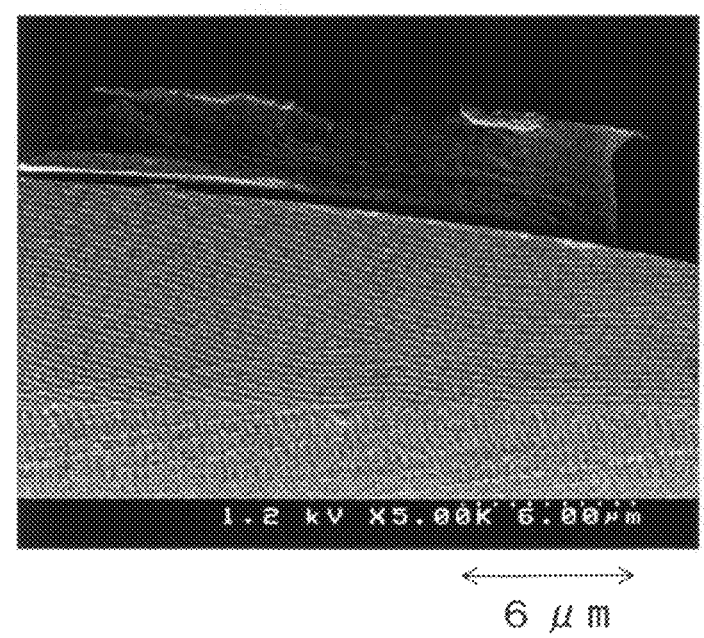
FIG. 6 is a scanning electron micrograph showing a repetitive layer structure of a cholesteric liquid crystal in the example of the present invention.

The methyl isobutyl ketone solution described above was used as an ink to carry out printing on the PET substrate obtained above having thereon the primer layer by a gravure printing method to form transparent patterns comprising dots in which a plane-viewing form was a circular form having a particle diameter of 100 μm. Next, the substrate was heated and dried, and cholesteric phase transfer was allowed to proceed. The above substrate was irradiated with a UV ray to cross-link the monomer molecules and the acrylate groups of the chiral agent by radicals generated from the photopolymerization initiator contained in the coating film to turn them into a polymer, whereby a transparent sheet was prepared. A cross section of the transparent sheet prepared which was orthogonal to the transparent substrate was observed under SEM to find that the above cross-sectional form of the printed dots was approximately semi-circular, and it was confirmed that the respective film surfaces of the multilayer structure corresponding to a half cycle of a spiral pitch in the cholesteric liquid crystal were curved in a similar way along the above approximately circular surface outline form (refer to FIG. 6). Further, the above transparent sheet was irradiated with an infrared ray to detect a reflected light thereof in the form of an image to find that it could be read at up to 45' and that the transparent sheet having a broad read angle was obtained.

Comparative Example 1

A transparent, sheet was prepared in the same manner as in Example 1, except that in Example 1, used was a TAC substrate obtained by preparing a solution by dissolving 2 mass parts of hydroxyethyl cellulose in 98 mass parts of purified water, coating the above solution on a TAC substrate and drying it to form a film at 100° C. A cross section of the transparent sheet which was orthogonal to the transparent substrate was observed under SEM to find that the above cross-sectional form of the printed dots was approximately semi-circular, and the respective film surfaces of the multilayer structure corresponding to a half cycle of a spiral pitch in the cholesteric liquid crystal were arranged similarly in a parallel linear group form along the above approximately rectangular surface outline form. Accordingly, it was confirmed that an angle formed by a spiral axis direction of the cholesteric liquid crystal and a normal line of the above transparent substrate in the dots was 0° and turned uniformly to a fixed angle. In this case, the read angle was 0°.

Comparative Example 2

A transparent sheet was prepared in the same manner as in Example 1, except that in Example 1, the leveling agent was not used in the solution spin-coated on the PET substrate. An angle formed by a spiral axis direction of the cholesteric liquid crystal in the above transparent sheet and a normal line of the above transparent substrate was 0°, which was the same as in Comparative Example 1, and in this case, the read angle was 0°.

INDUSTRIAL APPLICABILITY

The infrared ray reflection pattern-printed transparent sheet of the present invention is a member which can be applied to a data input system of a type of handwriting directly on a screen of a display device and which provides a coordinate detect means. It can reduce a work space, and in addition thereto, it is lightweight, low in a cost, readily increased in an area, possible in mass production and excellent in a read performance including a broad read angle. Accordingly, it can readily be used and has a high practical performance, and it can be used for various information processing devices such as portable phones, various mobile terminals such as PDA and the like, personal computers, TV phones, TV endowed with an intercommunication function, internet terminals and the like.

What is claimed is:

1. An infrared ray reflection pattern-printed transparent sheet in which infrared ray reflective transparent patterns are printed on a surface of a transparent substrate and in which the infrared ray reflection pattern-printed transparent sheet can be disposed oppositely to a front face of a display device capable of displaying images, wherein
   an ink constituting the infrared ray reflective transparent patterns contains an infrared ray reflection material, and the infrared ray reflective transparent patterns are patterns in which reflected patterns of an infrared ray can be read by an input terminal capable of irradiation and detection of an infrared ray and in which position information of the input terminal on the infrared ray reflection pattern-printed transparent sheet can be provided;
   the infrared ray reflection material is a liquid crystal material which has a wavelength selection reflectivity to a wavelength in an infrared region and which assumes a fixed cholesteric structure;
   when a cross section obtained by cutting the infrared ray reflective transparent patterns in a face orthogonal to the transparent substrate is observed under a scanning microscope, the infrared ray reflective transparent patterns comprise a multilayer structure, wherein the multilayer structure includes a fixed repeating cycle;
   a tilt angle formed by a helical axis of the liquid crystal material constituting the multilayer structure and a vertical line on of the transparent substrate is distributed in a range of at least 0 to 45°; and
   wherein the transparent patterns are dot patterns and a cross-sectional form of the dot patterns are a semi-circular outline form, and respective film surfaces of the multilayer structure corresponding to the half cycle of a spiral pitch in the liquid crystal material are curved along the semi-circular outline form.

2. The infrared ray reflection pattern-printed transparent sheet as described in claim 1, wherein the liquid crystal material having the fixed cholesteric structure comprises a chiral nematic liquid crystal material prepared by mixing a nematic liquid crystal with a chiral agent.

3. The infrared ray reflection pattern-printed transparent sheet as described in claim 2, wherein the nematic liquid crystal and the chiral agent have respectively cross-linkable functional groups, and the fixed cholesteric structure is fixed by cross-linking the cross-linkable functional groups.

4. The infrared ray reflection pattern-printed transparent sheet as described in claim 2, wherein at least one of the nematic liquid crystal or the chiral agent are compounds having an acrylate structure.

5. The infrared ray reflection pattern-printed transparent sheet as described in claim 1, wherein a primer layer is provided between the transparent substrate and the transparent patterns.

6. The infrared ray reflection pattern-printed transparent sheet as described in claim 1, wherein the transparent patterns have a selective reflection peak wavelength in 800 to 950 nm.

7. The infrared ray reflection pattern-printed transparent sheet as described in claim 1, wherein the transparent patterns have a print thickness of 1 to 20 μm.

8. The infrared ray reflection pattern-printed transparent sheet as described in claim 1, wherein the infrared ray reflection pattern-printed transparent sheet is equipped with a means for installation thereof onto the display device.

9. The infrared ray reflection pattern-printed transparent sheet as described in claim 1, wherein the infrared ray reflection pattern-printed transparent sheet is include an adhering instrument which is mounted on a contact face side of the infrared ray reflection pattern-printed transparent sheet, wherein the contact face side can be brought into contact with the display device and wherein the adhering instrument has an adhesive property or a sticky property for adhering the infrared ray reflection pattern-printed transparent sheet onto the display device.

10. The infrared ray reflection pattern-printed transparent sheet as described in claim 1, wherein the transparent sheet includes perforations or half cuts therein, wherein the half cuts are cuts in the transparent sheet that extend in a thickness direction in an amount less than the thickness of the transparent sheet.

* * * * *